Patented Sept. 20, 1932

1,878,121

UNITED STATES PATENT OFFICE

VICTOR E. EDWARDS, OF WEST BOYLSTON, MASSACHUSETTS, ASSIGNOR TO MORGAN CONSTRUCTION COMPANY, OF WORCESTER, MASSACHUSETTS, A CORPORATION OF MASSACHUSETTS

SHEARING MACHINE

Application filed March 7, 1930. Serial No. 433,961.

This invention relates to a machine for shearing moving material, such for example, as the elongated rolled product of a steel mill, or the like, which requires to be cut up into commercial lengths as fast as it is delivered from the finishing rolls of the mill. Shearing machines which perform their operations while moving in unison with such material, so as not to impede the latter's rapid and continuous delivery, are sometimes called "flying shears."

The present invention contemplates certain improvements in flying shears of the general type disclosed by Edwards Patent No. 1,047,185, dated December 17, 1912, the latter providing crank-operated upper and lower blades which approach each other vertically in the act of taking a cut on the moving material, and which are so mounted that upon engagement with said material, they move along with it until the cut is completed. According to the present invention, the engagement of the mutually approaching crank-operated blades with the moving material is obtained while said blades are moving substantially horizontally, in unison with said material, thereby materially reducing the shocks incident to each engagement of the blades with the material; furthermore, the blades are so mounted and arranged that each cutting operation can be performed with the upper blade substantially at or near the middle of its down stroke, and thus in a position most favorable to the exertion of maximum cutting pressure; the motion on the remainder of said down stroke, after the completion of the cut, is utilized most advantageously to shift the upper blade quickly out of the way of the oncoming material. Other and further objects and advantages of the invention will be made apparent in the following detailed description thereof, taken in connection with the accompanying illustrative drawings, in which—

Like reference characters refer to like parts in the different figures.

Figure 1:
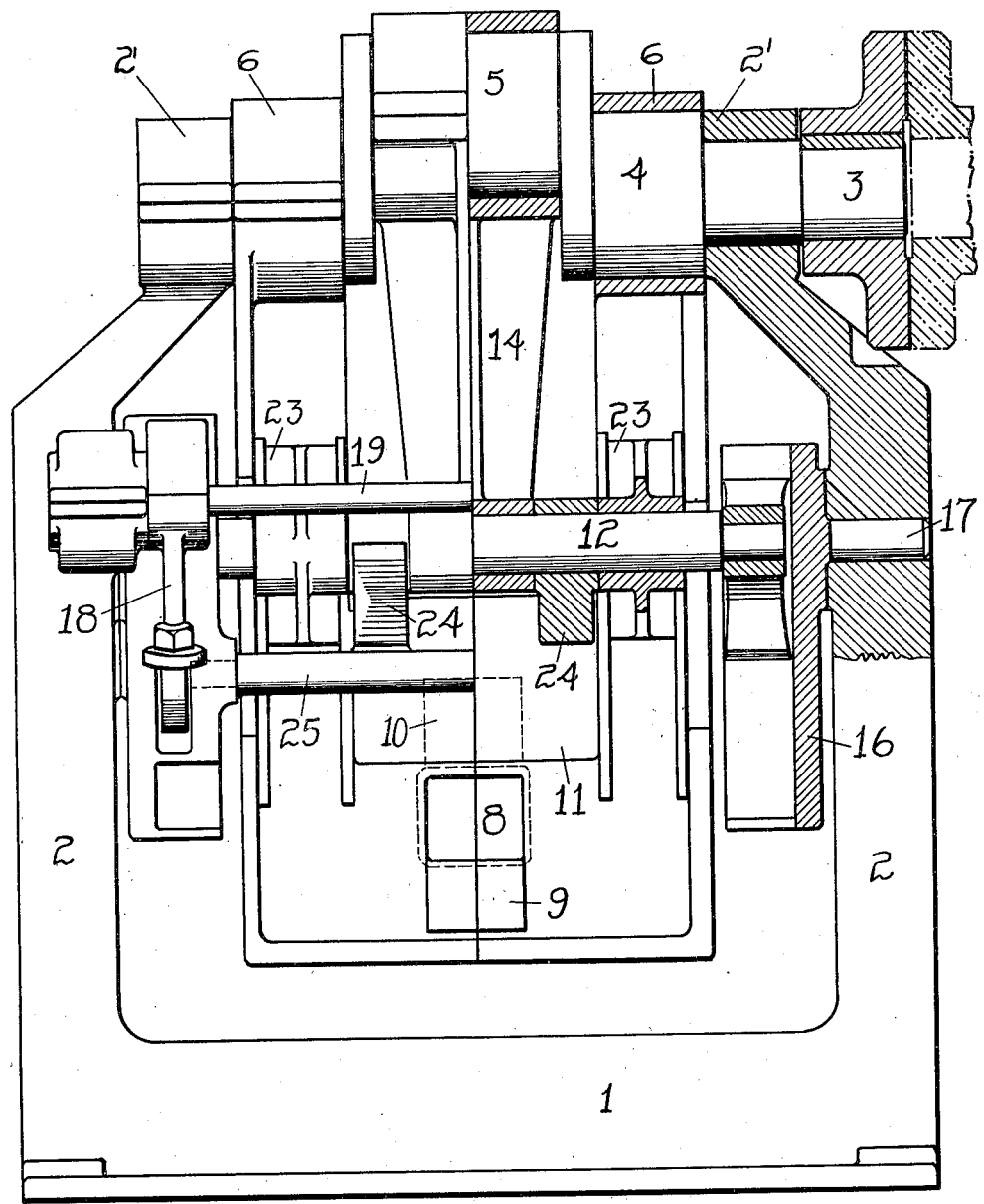
Fig. 1 is a front view, partly in section, of a shearing machine embodying the invention.

The machine provides the usual stationary base 1, having spaced upright sides 2, 2, whose upper ends afford suitable bearings 2', 2', for and operating shaft 3. Said shaft 3, inwardly of its bearings in the sides 2, 2, provides spaced matching eccentric portions 4, 4 and, between the latter, an intermediate eccentric portion 5; these eccentrics or cranks 4 and 5 (for the operation respectively of the lower and upper shear blades) are, for a purpose to be hereinafter described, spaced approximately 90° apart,—in contradistinction to the 180° spacing of the blade-operating eccentrics or cranks of the aforesaid Edwards patent. Suitable eccentric straps 6, 6, carried by the eccentrics 4, 4, provide for the suspension therefrom of a frame 7 which, in consequence of its above described mounting on the shaft 3, is free to swing between the sides 2, 2 of the shear housing or base 1.

Figure 2:
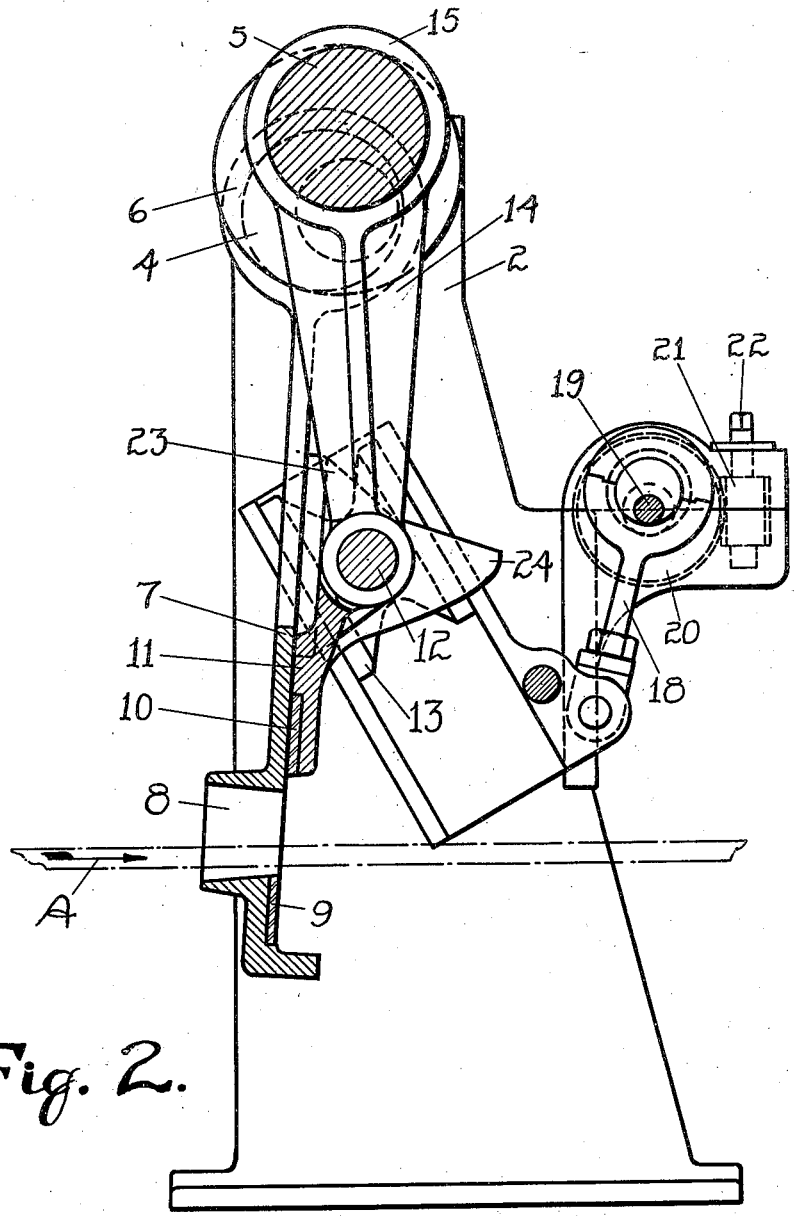
Figs. 2, 3 and 4 are side elevational views, partly in section, showing the mechanism of the invention at three different stages in its cycle of operation.
Figure 3:
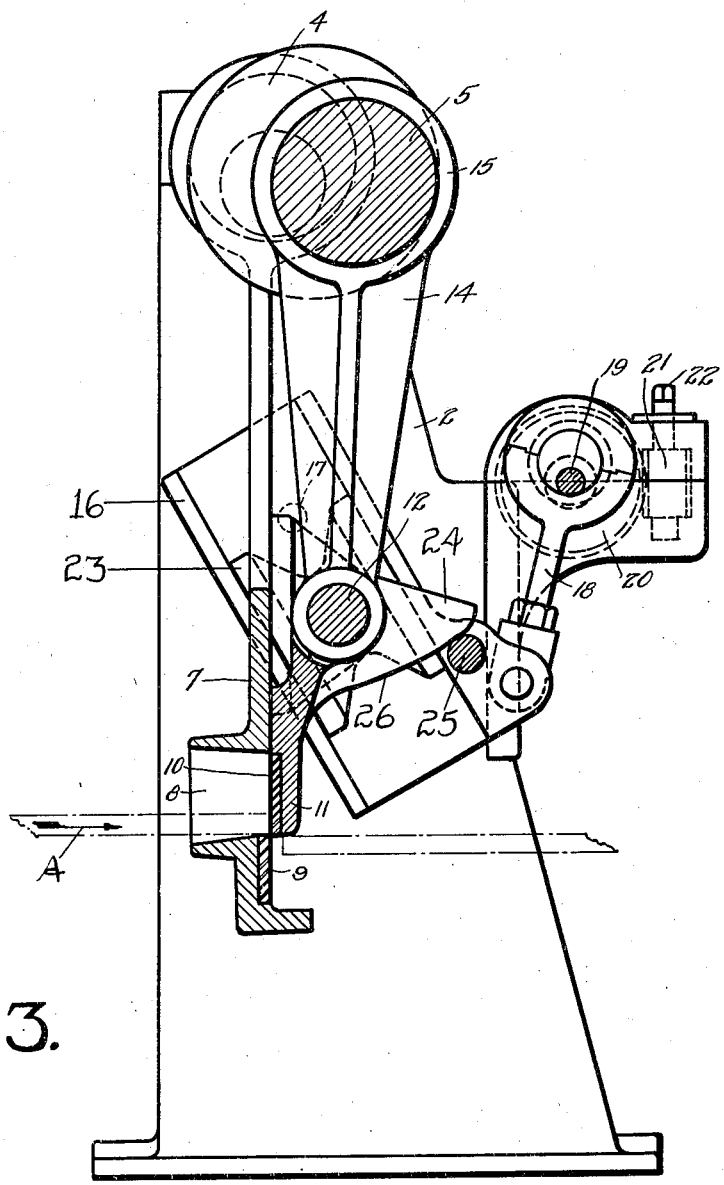
Figure 4:
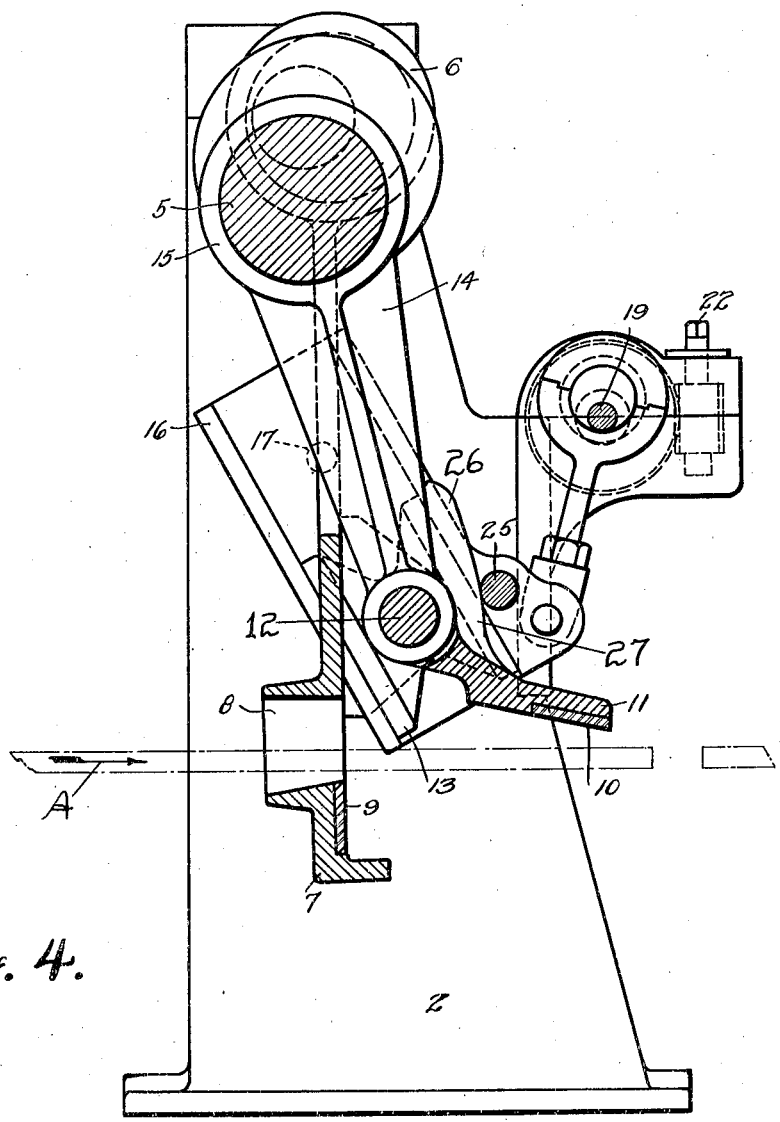

Said frame 7 provides a suitable opening 8, for the longitudinal passage of the material, moving longitudinally in the direction indicated by the arrow A, Figs. 2, 3 and 4. Adjacent said opening 8, said frame 7 has rigidly supported therein the lower shear blade 9, the latter adapted to cooperate with a slidably mounted upper shear blade 10 which is caused to approach the blade 9 at each cut taken by the shear, as illustrated in Fig. 3.

Said upper blade 10, according to the invention, is carried at the lower free end of a member 11, the latter being pivoted for swinging movement about a pin 12, which is mounted in a sliding crosshead 13. Said pin 12 constitutes also the pivotal connection between said crosshead 13 and a connecting rod 14, whose upper end is formed as an eccentric strap 15 in surrounding relation to the central eccentric portion 5 of shaft 3.

The crosshead 13, according to the illustrated embodiment of my invention, is fitted to slide in the inclined guides 16, 16, which guides are carried by the sides 2, 2 of the stationary housing, and adapted for adjustment to vary their inclination. To this end, each guide 16, as best shown at the right hand side of Fig. 1, provides a trunnion support 17, suitably journalled in the adjacent housing side 2, the same affording a pivotal axis for the adjustment of the guide to any desired degree of inclination. The adjustment mechanism, for shifting each guide and holding it in the desired position, is here shown as consisting of a pivotally attached link or rod 18, whose other end is eccentrically connected, as shown in Figs. 2, 3 and 4, to an adjusting spindle 19 carried by the stationary housing; a worm gear 20 on said spindle meshes with a suitably mounted worm 21, the latter being turnable, as by engagement of a wrench with its extension 22, to impart relatively small angular movements to the spindle 19, thereby to give the guide 16 a limited turning movement about the axis of its trunnion 17, to obtain the desired inclination of said guide.

The shaft or pin 12, extending transversely between spaced crosshead portions 13, 13 that slide in the inclined guides 16, 16, carries pivotally mounted shoes 23, 23 that bear against an inner surface of frame 7. The swinging member 11, carrying upper knife 10, which is mounted on shaft 12 inwardly of said shoes 23, 23, is normally maintained in contact with the inner surface of frame 7 by counterweighted portions 24, 24. In the operation of the above described mechanism, with the stock passing between the shear blades 9 and 10 in the direction of the arrow A, Figs. 2, 3 and 4, a single revolution of the shaft 3 procures a cutting movement and a return movement of the shear in the following manner:—

In the normal or rest position of the parts shown in Fig. 2, the crosshead 13, from which is suspended the upper knife-carrying member 11, is substantially at the top of its stroke, while the frame 7, carrying the lower knife 9, and eccentrically mounted, in the present instance, for a movement of lesser magnitude than the crosshead 13, is substantially midway between its upper and lower limits of movement. When an actuation of the shaft 3 is inaugurated, the two knives 9 and 10 rapidly approach each other to take the cut, as illustrated in Fig. 3, and this movement, owing to the forward inclination of the crosshead guides 16, 16, is accompanied from the very outset by a pronounced right hand swing of the frame 7, which insures a practically horizontal movement of the two knives before and at the instant of engaging with the moving material, in the act of taking a cut. In other words, each knife, instead of moving substantially vertically until it engages the moving material, as in previous shearing machines of this type, is constrained, by the above described mechanism, to partake of horizontal motion, in the direction of movement of the material, as it approaches the other knife for a cutting operation, in consequence of which each cutting operation is initiated substantially in the absence of any severe shock or blow, and in the absence of any tendency to interrupt or impede the uniform forward motion of the material. The above described angular adjustment of the guides 16, 16 permits of the latter being given such inclination as will impart to the blades or knives, both before and during the cutting operation, a horizontal motion at substantially the same speed as the motion of the material; by shifting said inclined guides toward a vertical position the speed of horizontal motion is decreased, and by shifting said guides toward a horizontal position, the speed of said horizontal motion is increased.

Fig. 3 shows the position of the parts as the cut is completed, the frame 7 and the two knives 9 and 10 having moved nearly horizontally with the material from the position shown in Fig. 1, under the influence of the forwardly inclined guides 16, 16. At the same time, the lower knife 9 has been subjected to a slight upward movement, and the upper knife 10 to a downward movement of considerably greater magnitude, but, obviously, these conditions could be reversed without departure from the principles of my invention; if the lower knife were given the larger stroke, then preferably the inclined guiding devices, to insure horizontal motion of the knives at the instant of engaging the material for a cut, would be applied to the frame or carrier of said lower knife, rather than to the crosshead that imparts motion to the upper knife.

At the completion of the cut, as shown in Fig. 3, the lower knife 9 has reached substantially the upper limit of the stroke imparted by its crank or eccentric 4, while the crosshead pin or shaft 12 (carrying upper knife 10) has only completed about half of the downward stroke imparted by its crank or eccentric 5. This is the result of said cranks being offset from each other by approximately 90°, instead of the usual 180° offset shown in the aforesaid Edwards patent; because of this arrangement, the upper knife 10 is enabled to perform its part of the work of cutting while moving at practically the maximum downward speed that it can attain, during any revolution of its operating crank or eccentric 5,—a condition which is conducive not only to complete severance of the material in the shortest possible unit of time, but also to the accomplishment of the same while the upper knife 10 is receiving the maximum downward pressure. The completion of the cut, as shown in Fig. 3, leaves said upper knife 10 directly in the path of the oncoming material, and the ensuing downward movement of the crosshead 13 in the guides 16, 16 is availed of in the following manner, to get the knife 10 quickly out of the way of the oncoming material.

The guides 16, 16 carry between them a transversely extending bar 25, the same standing in the path of the descending counterweighted portions 24, 24 of the upper knife carrier 11. The engagement of the portions 24, 24 with bar 25 occurs almost simultaneously with the completion of the cut, as shown in Fig. 3, and the ensuing downward movement of crosshead 13 in the guides 16, 16 results, through such engagement, in a counterclockwise swinging movement of the carrier 11 on the shaft or pin 12. In spite of the fact that the pivot shaft 12 of upper knife 10 is at this time still moving downwardly, said knife is not permitted to obstruct or retard the oncoming stock; on the contrary, due to the cam surfaces 26, 26, afforded by the lower edges of the counterweights 24, 24 that engage the bar 25, the upper knife carrier 11 is constrained to swing outwardly and forwardly by the further downward movement of crosshead 13 and shaft 12, so as to clear the stock entirely, as shown in Fig. 4, which represents the lower limit of movement of said crosshead 13. In the ensuing return movement of the parts to the positions shown in Fig. 2, the initial upward travel of crosshead 13 is effected in the absence of any appreciable angular shifting of the upper knife carrier 11 on the shaft 12, this being due to the cam portions 27 of the counterweights 24, 24 that keep said carrier in the position shown by Fig. 4, to prevent the upper knife from contacting with the moving stock. When the crosshead 13 and pivot shaft 12 have moved up a sufficient distance to allow the knife carrier 11 to swing clockwise without striking the moving stock, the cam surfaces 26, 27 will then be carried clear of the bar 25, and thus the counterweights 24, 24 become effective to restore the upper knife 10 to normal position against the inner surface of frame 7, as illustrated in Fig. 2. The cutting and return movements above described take place in the course of a single revolution of the shaft 3, the usual means, not herein shown or described, being employed to bring the shaft to rest, at the completion of a single revolution, so as to leave the parts in the position shown in Fig. 2, in readiness for the next cut to be made on the moving material.

I claim:

1. A shearing machine of the class described for operation on moving material, comprising upper and lower cooperating knives, a driving shaft common to said knives, cranks on said shaft for both knives to cause them to approach each other for each cut taken on said material, and an inclined guide for controlling said approach movement to produce approximately horizontal travel of both knives before and at the instant of their engagement with the moving material, in the act of taking a cut thereon.

2. A shearing machine of the class described for operation on moving material, comprising upper and lower cooperating knives, a driving shaft common to said knives, cranks on said shaft for both knives to cause them to approach each other for each cut taken on said material, and an inclined guide for controlling said approach movement to produce approximately horizontal travel of both knives before and at the instant of their engagement with the moving material, in the act of taking a cut thereon, and means for adjusting said guide, to make the speed of said horizontal travel conform substantially with the speed of the material.

3. A shaft-driven "flying shear," comprising cooperating upper and lower knives, an operating crank on said shaft for each knife, to effect their approach at each cutting operation, said cranks being of unequal length, with the shorter substantially at the end of its stroke, and the longer near the middle of its stroke when said knives meet in the act of cutting, thereby producing said cut when the knife with the longer stroke is moving at substantially its maximum speed.

4. A shaft-driven "flying shear," comprising cooperating upper and lower knives, an operating crank on said shaft for each knife, to effect their approach at each cutting operation, said cranks being of unequal length, with the shorter substantially at the end of its stroke, and the longer near the middle of its stroke when said knives meet in the act of cutting, and an inclined guide effective on the knife with the longer crank to produce flying motion of said knives substantially in unison with the motion of the material cut by said shear.

5. A "flying shear" of the class described, having crank-driven lower and upper knives, the latter, at the completion of each cutting operation, being substantially at the middle of its downward stroke, and cam means operative on said upper knife during the remainder of the downward stroke of its crank, to rock said knife out of the path of the material being cut by said shear.

6. A "flying shear" of the class described having crank-driven lower and upper knives, the latter, at the completion of each cutting operation, being substantially at the middle of its downward stroke, and cam means responsive to the further descending movement of said crank for rocking said upper knife out of the path of the material being cut by said shear.

7. A shaft-driven "flying shear," comprising cooperating upper and lower knives, an operating crank on said shaft for each knife, to effect their approach at each cutting operation, said cranks being of unequal length, the shorter crank connecting with the lower knife and the longer crank connecting with the upper knife, and said cranks being approximately 90° apart, so that the shorter is substantially at the end of its stroke and the longer near the middle of its stroke when said knives meet in the act of cutting.

8. A shaft-driven "flying shear," comprising cooperating upper and lower knives, an operating crank on said shaft for each knife, to effect their approach at each cutting operation, said cranks being of unequal length, the shorter crank connecting with the lower knife and the longer crank connecting with the upper knife, and said cranks being approximately 90° apart, so that the shorter is substantially at the end of its stroke and the longer near the middle of its stroke when said knives meet in the act of cutting, in combination with an inclined guide effective on the upper knife to produce a horizontal component of said knife's motion at the instant of cutting.

9. Shearing mechanism of the class described for operation on moving material, comprising upper and lower cooperating knives, a driving shaft common to said knives, cranks on said shaft for both knives to cause them to approach each other for each cut taken on said material, and means effective on each approach of said knives, before they engage said material, to constrain motion thereof in substantially the direction of said material's motion.

10. Shearing mechanism of the class described for operation on moving material, comprising upper and lower cooperating knives, a driving shaft common to said knives, cranks on said shaft for both knives to cause them to approach each other for each cut taken on said material, and means effective on each approach of said knives, after their engagement with said material, to constrain motion thereof in substantially the direction of said material's motion.

11. Shearing mechanism of the class described for operation on moving material, comprising upper and lower cooperating knives, a driving shaft common to said knives, cranks on said shaft for both knives to cause them to approach each other for each cut taken on said material, and means effective on each approach of said knives, before and after their engagement with said material, to constrain motion thereof in substantially the direction of said material's motion.

12. Shearing mechanism of the class described for operation on moving material, comprising upper and lower cooperating knives, a driving shaft common to said knives, cranks on said shaft for both knives to cause them to approach each other for each cut taken on said material, and means effective on each approach of said knives, in cutting said material, to constrain motion thereof in substantially the direction of said material's motion.

13. Shearing mechanism of the class described for operation on moving material, comprising upper and lower cooperating knives, a driving shaft common to said knives, cranks on said shaft for both knives to cause them to approach each other for each cut taken on said material, means effective on each approach of said knives, in cutting said material, to constrain motion thereof in substantially the direction of said material's motion, and an adjustment for said means to vary the speed of the last-mentioned knife travel in accordance with the speed of the material.

VICTOR E. $\overset{\text{his}}{\times}$ EDWARDS.
mark